United States Patent
Ansari et al.

(10) Patent No.: US 10,292,058 B2
(45) Date of Patent: May 14, 2019

(54) RADIO OVER FIBER ANTENNA EXTENDER SYSTEMS AND METHODS FOR HIGH SPEED TRAINS

(71) Applicant: NEW JERSEY INSTITUTE OF TECHNOLOGY, Newark, NJ (US)

(72) Inventors: Nirwan Ansari, Montville, NJ (US); Tao Han, MAtthews, NC (US)

(73) Assignee: New Jersey Institute of Technology, Newark, NJ (US)

( * ) Notice: Subject to any disclaimer, the term of this patent is extended or adjusted under 35 U.S.C. 154(b) by 209 days.

(21) Appl. No.: 14/968,365

(22) Filed: Dec. 14, 2015

(65) Prior Publication Data
US 2016/0174241 A1    Jun. 16, 2016

Related U.S. Application Data

(60) Provisional application No. 62/092,615, filed on Dec. 16, 2014.

(51) Int. Cl.
*H01Q 1/32* (2006.01)
*H04W 84/00* (2009.01)
(Continued)

(52) U.S. Cl.
CPC .............. *H04W 24/02* (2013.01); *H01Q 1/32* (2013.01); *H04W 36/0009* (2018.08);
(Continued)

(58) Field of Classification Search
CPC ....... H01Q 1/32–3291; H04W 84/005; H04W 24/02
See application file for complete search history.

(56) References Cited

U.S. PATENT DOCUMENTS

2004/0264969 A1* 12/2004 Lee ................. H04B 10/272
                                                                398/115
2009/0239565 A1*  9/2009 Han ................. H04B 7/0404
                                                                455/512
(Continued)

FOREIGN PATENT DOCUMENTS

JP         2006261813 A  *  9/2006   ............... H04B 7/08

OTHER PUBLICATIONS

Amtrak Mechanical Department Bureau of Rolling Stocking Engineering, Specification for PRIIA Bi-Level Passenger Rail Car, PRIIA Specification No. 305-001, Revision C.1, Sep. 20, 2012, 605 pages.*

(Continued)

*Primary Examiner* — Hoon J Chung
(74) *Attorney, Agent, or Firm* — Timothy X. Gibson; Gibson & Dernier LLP

(57) ABSTRACT

Radio-over-fiber (ROF) antenna extender systems and methods are disclosed for high speed train communications which utilize cellular networks as backhauls to avoid the expensive capital expenditure involved in providing broadband Internet services in high speed trains. Employing ROF technology, on-roof antennas are deployed in strategic configurations to address the drawbacks of utilizing cellar networks as backhauls. The systems and methods provide broadband Internet service to a train and include a plurality of antennas mounted to an exterior of the train and operable to communicate with a cellular network, wireless access points mounted to the train, and a control system operably coupled to the plurality of antennas and to the wireless access points, wherein the control system is operable to receive and process data received from the plurality of antennas and the one wireless access points.

23 Claims, 5 Drawing Sheets

(51) Int. Cl.
*H04W 24/02* (2009.01)
*H04W 88/08* (2009.01)
*H04W 36/00* (2009.01)

(52) U.S. Cl.
CPC ...... *H04W 36/0016* (2013.01); *H04W 84/005* (2013.01); *H04W 88/085* (2013.01)

(56) References Cited

U.S. PATENT DOCUMENTS

| | | | | |
|---|---|---|---|---|
| 2010/0085911 | A1* | 4/2010 | Nomoto | H04B 1/18 370/328 |
| 2010/0226455 | A1* | 9/2010 | Porat | H04B 7/024 375/267 |
| 2010/0283678 | A1* | 11/2010 | Ketonen | G01S 3/18 342/357.49 |
| 2011/0116794 | A1* | 5/2011 | George | H04B 10/25754 398/45 |
| 2015/0131751 | A1* | 5/2015 | Bayesteh | H04B 7/0413 375/267 |
| 2016/0028533 | A1* | 1/2016 | Kazmi | H04W 72/1278 370/296 |
| 2016/0249233 | A1* | 8/2016 | Murray | B61L 27/0005 |

OTHER PUBLICATIONS

Ito et al., Machine Translation of JP2006-261813 A, dated Sep. 28, 2006, 16 pages.*
"China Railway Market Study" OSEC Business Network Swizeland [Online]. Available: http:/www.s-ge.com/de/filefieldprivate/files/1673/field_blog_public_files/7908 Jan. 2011.
A. Kanafani, H. Benouar, B. Chiou, J.-L. Ygnace, K. Yamada, and A. Dankberg, "California Trains Connected," California PATH Research Report, Institute of Transportation Studies, University of California, Berkeley. [Online]. Available: http://www.its.berkeley.edu/publications/UCB/2006/PRR/ UCB-ITS-PRR-2006-4.pdf Apr. 2006.
D. Fokum and V. Frost, "A survey on methods for broadband internet access on trains," IEEE Communications Surveys & Tutorials, vol. 12, No. 2, pp. 171-185, 2010.
J. Wang, H. Zhu, and N. Gomes, "Distributed antenna systems for mobile communications in high speed trains," IEEE Journal on Selected Areas in Communications,, vol. 30, No. 4, pp. 675-683, 2012.
W. Luo, R. Zhang, and X. Fang, "A CoMP soft handover scheme for LTE systems in high speed railway," EURASIP Journal on Wireless Communications and Networking, 2012:196, pp. 1-9, 2012.
O. Karimi, J. Liu, and C. Wang, "Seamless wireless connectivity for multimedia services in high speed trains," IEEE Journal on Selected Areas in Communications, vol. 30, No. 4, pp. 729-739, 2012.
A. Seyedi and G. Saulnier, "General ICI self-cancellation scheme for OFDM systems," IEEE Transactions on Vehicular Technology, vol. 54, No. 1, pp. 198-210, 2005.
Y.-C. Yu, M. Okada, and H. Yamamoto, "Study for various array antenna assisted Doppler spread compensator with MRC diversity of ISDB-T receiver," in Vehicular Technology Conference, 2006. VTC 2006—Spring. IEEE 63rd, vol. 6, pp. 2947-2951, 2006.
D. Wake, A. Nkansah, and N. Gomes, "Radio over fiber link design for next generation wireless systems," Journal of Lightwave Technology, vol. 28, No. 16, pp. 2456-2464, 2010.
B. Lannoo, D. Colle, M. Pickavet, and P. Demeester, "Radio-over-fiber-based solution to provide broadband internet access to train passengers," IEEE Communications Magazine IEEE, vol. 45, No. 2, pp. 56-62, Feb. 2007.
K. Ishizu, M. Kuroda, and H. Harada, "Bullet-train network architecture for broadband and real-time access," in Computers and Communications, 2007. ISCC 2007. 12th IEEE Symposium on, 2007, pp. 241-248.
Y.-C. Chen, E. M. Nahum, R. J. Gibbens, D. Towsley, and Y. sup Lim, "Characterizing 4G and 3G networks: Supporting mobility with multi-path TCP," UMass Amherst Technical Report: UM-CS-2012-022. http://people.cs.umass.edu/~yungchih/publication/12_mtcp_4g_tech_report.pdf, 13 pages, 2010.
V. Erceg, L. Greenstein, S. Tjandra, S. Parkoff, A. Gupta, B. Kulic, A. Julius, and R. Bianchi, "An empirically based path loss model for wireless channels in suburban environments," IEEE Journal on Selected Areas in Communications, vol. 17, No. 7, pp. 1205-1211, 1999.

* cited by examiner

RADIO OVER FIBER ANTENNA EXTENDER SYSTEMS AND METHODS FOR HIGH SPEED TRAINS

CROSS-REFERENCE TO RELATED APPLICATIONS

This application claims the benefit of U.S. Provisional Patent Application Ser. No. 62/092,615 filed Dec. 16, 2014, the entirety of which is incorporated herein by reference.

FIELD OF THE INVENTION

This invention relates to providing broadband internet services on transportation systems such as trains, and in particular, to on-train radio-over-fiber (RoF) systems and methods employing antennas.

BACKGROUND OF THE INVENTION

Providing broadband Internet services in trains is important for passengers. Train passengers spend hundreds of million of dollars every year for on-board WiFi services. Studies have shown the vast majority of business travelers are interested in using WiFi in trains and would prefer to use trains instead of planes if WiFi services were available.

SUMMARY OF THE INVENTION

Radio-over-fiber (ROF) antenna extender systems and methods for high speed train communications are disclosed which utilize cellular networks as backhauls to avoid the expensive capital expenditure involved in providing broadband Internet services in high speed trains. Employing ROF technology, on-roof antennas are deployed in strategic configurations to address the drawbacks of utilizing cellar networks as backhauls. Thus, the systems and methods disclosed herein provide cost effective and high quality communications solutions for provisioning broadband Internet services in high speed trains.

The systems and methods disclosed herein include three important aspects: an exterior antenna system, a control system, and wireless access points. The systems and methods employ the antenna system to maintain a relative stationary channel between high speed trains and their serving base stations (BSs). Further, the antenna system coordinates traffic from different wireless access points thereby optimizing the handover processes to mask and effectively eliminate handover delay from the passengers and alleviate the quality of service (QoS) deterioration caused by the handover processes.

In accordance with an embodiment, a system for providing broadband Internet service to a train includes a plurality of antennas mounted to an exterior of the train and operable to communicate with at least one cellular network, at least one wireless access point mounted to the train, and a control system operably coupled to the plurality of antennas and to the at least one wireless access point, wherein the control system is operable to receive and process data received from the plurality of antennas and the at least one wireless access point. The antennas may be grouped in one or more clusters. The antennas may be mounted in any suitable location on the exterior of the train. In at least some embodiments the at least some of the antennas are mounted to a roof of the train.

The wireless access point may include at least one radio interface selected from Long Term Evolution, (LTE), Worldwide Interoperability for Microwave Access (WiMax), and WiFi. The system may include plural wireless access points. The wireless access points may be coupled, such as via fiber links or connections, and be operable to aggregate wireless traffic and communicate the traffic to the control system.

The control system may include various programming such as programming operable to schedule cellular communication traffic to maintain fairness among users, to explore capacity of the antennas, and to optimize and control the antennas to maximize network capacity.

In at least some embodiments the control system may include a wavelength routing switch operable to balance traffic among the antennas. The control system may also include a radio frequency controller and be operable to process signals received from or transmitting to the antennas.

In some embodiments the control system is operable to collect data relating to the speed of a train and round trip time of a connecting cellular network and adapt its signal processing process based on the collected data.

The system may include antennas grouped in various arrays. For example, and not by way of limitation, the antennas may be grouped into plural antenna clusters. The control system may be operable to jointly process signals received by the antennas in the clusters to enhance signal to noise ratio.

In accordance with further embodiments, methods are disclosed for providing broadband Internet access to at least one device residing on a train, the method including providing a plurality of antennas on the exterior of the train and operable to communicate with at least one cellular network, providing at least one wireless access point mounted to the train, providing a control system operably coupled to the plurality of antennas and to the at least one wireless access point, receiving in the control system data from the plurality of antennas and the at least one wireless access point and processing the received data to obtain a relative stationary channel between a train and serving base stations of the at least one cellular network.

The method may include aggregating wireless traffic using the at least one wireless access point and communicating the traffic to the control system.

The method may include employing in the control system programming operable to schedule cellular communication traffic to maintain fairness among users; to explore capacity of the plurality of antennas; and to optimize and control the plurality of antennas to maximize network capacity.

In some embodiments the method includes providing the control system with a wavelength routing switch operable to balance traffic among the plurality of antennas. The method may include providing the control system with a radio frequency controller.

In accordance with some embodiments, the method may include collecting data relating to the speed of a train and round trip time of a connecting cellular network and adapting signal processing processes based on the collected data. The method may involve grouping the plurality of antennas into plural antenna clusters and jointly processing signals received by the antennas in the clusters to enhance signal to noise ratio.

In accordance with further embodiments, the method may include estimating a return trip time (RTT) between the plurality of antennas and serving base station based on a location of a train during operation of the train, calculating based on the return trip estimation a traveling distance of the train within one RTT and selecting at least one of the plurality of antennas closest to a location where a data request was sent as a receiving antenna for a corresponding acknowledgment.

The method may also include retrieving Doppler shift compensation information based on a location of at least one of the plurality of antennas and applying compensation to the received signal.

In still further embodiments the method includes applying via the control system multiple antennas to jointly receive a downlink transmission signal from a serving base station to the train to reduce error rates and enhance reliability of communication links.

In yet further embodiments the method includes applying via the control system multiple stream beamforming for transmitting signals from the train to a serving base station to improve signal to noise ratio of receiving signals in the serving base station and to enhance reliability of a communication link in an uplink direction.

Many solutions have been proposed to enable high quality broadband Internet services in trains. Based on access network technologies, these solutions can be classified into four categories: cellular network based solutions, radio-over-fiber (RoF) based solutions, leaky coaxial cable based network access, and satellite communication based solutions. Each of these approaches has its drawbacks.

Currently, the dominant wireless communication system for railway is the global system for mobile for rail (GSM-R). The GSM-R network is based on the second generation mobile communication techniques which can only provide a data rate of up to 200 kps to mobile users. Long Term Evolution (LTE) has been chosen as the next generation railway communications system by the International Union of Railway (UIC). The LTE system, which enhances spectrum and power efficiency, provides higher data rates to mobile users. However, the LTE system is not optimized for fast moving users, e.g., users moving at a speed of 300-500 km/h. The provision of broadband internet access to high speed trains through LTE networks encounters two major technical difficulties: the drastically changing channel condition and overly frequent handovers. LTE adopts Orthogonal Frequency Division Multiplexing (OFDM) as its transmission scheme. This scheme is robust to frequency selective fading because the bandwidth of the subcarriers is much smaller than the coherent bandwidth of the channel. However, the fast channel condition changes the Doppler spread, which deteriorates the orthogonality among the subcarriers, and leads to severe interchannel interference (ICI). Several approaches have been proposed to mitigate the performance deterioration caused by the Doppler spread. The first approach is to estimate and remove the frequency offset. The second approach is to apply signal processing and frequency domain coding to reduce the sensitivity of the OFDM system to the frequency offset. The third approach utilizes an antenna array to compensate for the Doppler spread.

Overly-frequent handovers is another challenge in delivering broadband internet services to high speed trains through LTE. The handover process is the process in which the users negotiate and change their operating frequency to a new base station (BS). On the one hand, since the train is moving very fast, users in the train traverse the overlapping coverage area in a very short time. If the handover delay is not short enough, the handover process may fail and the users will be out of service. On the other hand, since a cabin of the train may carry tens of passengers, all the passengers will request handover at almost the same time. This may lead to signaling congestion which prevents users from handing over successfully. To address this challenge, a cell array solution has been proposed which organizes LTE cells along a railway and sets up a femto cell in the train cabin to aggregate traffic demands. O. Karimi, J. Liu, and C. Wang, "Seamless wireless connectivity for multimedia services in high speed trains," Selected Areas in Communications, IEEE Journal on, vol. 30, no. 4, pp. 729-739, 2012. The cell array solution enables a seamless handover by predicting the upcoming LTE cells based on the movement of the train.

Radio over fiber (RoF) is a well-established technique for distributing wireless communication signals. The distributed antenna system (DAS) is one of the major applications of the RoF technique. In a DAS, multiple remote antenna units (RAUs) are connected to a central unit via RoF transmission links. The RAUs are able to provide excellent coverage and dedicated capacity for short range communications. By taking advantage of the RoF-based DAS, a "moving cell" concept was proposed to mitigate the handover difficulty for high speed trains. B. Lannoo, D. Colle, M. Pickavet, and P. Demeester, "Radio-over-fiber-based solution to provide broadband internet access to train passengers," Communications Magazine, IEEE, vol. 45, no. 2, pp. 56-62, 2007. The idea of the "moving cell" concept is that, instead of requiring the passengers to adapt frequency during the handover process, the BSs track the movement of the trains and reconfigure their operating frequency accordingly to maintain the communication links with the passengers. To realize the "moving cell" concept, the RAUs are deployed along the rails to provide seamless coverage for the train. These RAUs are connected via fiber links with the central unit that tracks the movement of the train and reconfigures the operating frequency of these RAUs. Owing to the low latency of fiber links, the cell reconfiguration is easily synchronized with the movement of the train. In the train, several wireless access points with radio interfaces of multiple access technologies are set up to aggregate traffic from the passengers. These wireless access points relay traffic between users and the RAU along the rail. Based on the "moving cell" concept, many solutions have been proposed to enhance the performance of the RoF based DAS system. J. Wang, H. Zhu, and N. Gomes, "Distributed antenna systems for mobile communications in high speed trains," Selected Areas in Communications, IEEE Journal on, vol. 30, no. 4, pp. 675-683, 2012. However, a major limitation in implementing the "moving cell" concept is the huge cost in deploying the fiber connected RAUs along the rails. For example, in China, railway transportation is the major transportation method for residents. Deploying and maintaining RAUs along the vast number of rails is prohibitively costly, and in some mountainous areas, it is impossible to deploy RoF based DAS.

Leaky coaxial cable (LCX) may be used as an antenna for data transmission and reception. The cable is slotted on its outer conductor to enable signal transmission and electromagnetic wave radiation. LCX is deployed along railway lines in Japan for radio communications on trains. LCX can be utilized as backhaul connections for providing Internet services to passengers in trains. A mobile-LCX architecture for Internet service on bullet trains has been proposed. K. Ishizu, M. Kuroda, and H. Harada, "Bullet-train network architecture for broadband and real-time access," Computers and Communications, ISCC (2007) 12th IEEE Symposium 2007, pp. 241-248. In each train, a mobile bridge, which consists of radio interfaces for different types of access technologies such as IEEE 802.11, WiMax, and LCX, is deployed to aggregate data traffic in the train and communicate with the LCX based stations. The maximum data rate of the LCX-based communication is 768 kps which cannot satisfy the bandwidth requirement for broadband Internet services.

Owing to their vast coverage area, satellites can be utilized to provide Internet services to train passengers. In order to connect with satellites, a pointing system, which performs satellite acquisition and tracking, is set up in the train. In addition, a communication subsystem is deployed to aggregate data traffic within the train. However, providing broadband Internet services via satellite links has several drawbacks. First, the delay of satellite communications, which is about 500-600 ms, is not suitable for real-time Internet applications. Second, the bandwidth of satellite links is limited and cannot satisfy the explosive traffic demands from hundreds of passengers in the train. Third, satellite communications highly depend on weather conditions and terrain of the environment. On rainy days, the satellite signals are severely attenuated by the rain, thus resulting in significant capacity decrease. In addition, the satellite coverage in urban areas and hilly areas is very poor, and satellite signals cannot reach tunnels.

BRIEF DESCRIPTION OF THE DRAWINGS

So that those having ordinary skill in the art will have a better understanding of how to make and use the disclosed systems and methods, reference is made to the accompanying figures wherein:

FIGS. 4(a)-4(c) are graphical depictions of a system capacity comparison between a prior art communication system (FIG. 4(a)) and two embodiments (FIGS. 4(b) and 4(c)) according to one or more embodiments of the present invention;

DETAILED DESCRIPTION OF THE INVENTION

Figure 1:
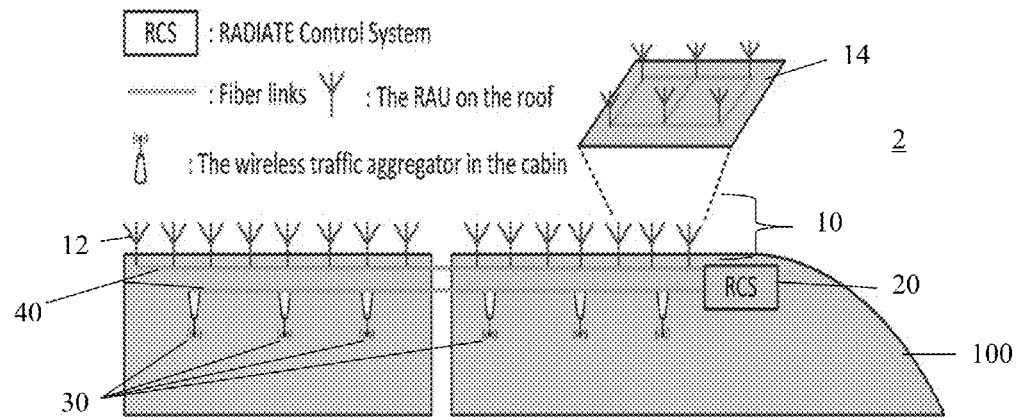
FIG. 1 is a schematic depiction of the architecture of a system according to one or more embodiments of the present invention.

The following is a detailed description of the invention provided to aid those skilled in the art in practicing the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Although the devices and systems of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention.

The provision of broadband Internet services to high speed trains based on cellular networks, while economical, is not reliable due to drastically varying channel condition and the overly frequent handovers which significantly deteriorate the performance of cellular networks. Currently, the high speed motion of a train deteriorates the communication links between the passengers and the serving BSs in two aspects. First, the high speed introduces the Doppler spread, which leads to severe inter channel interference. Second, the channel quality measurement is deactivated because of the fast motion. In other words, the channel condition when the passengers receive the acknowledgment for the serving BS changes dramatically as compared to the channel condition reported to the BS.

By way of illustration, the round trip time (RTT) of LTE networks is roughly about 70 to about 140 ms. The velocity of a high speed train is about 300 to about 500 km/h. Assuming the RTT of LTE networks is 100 ms and the velocity of the high speed train is 100 m/s, a user riding the train moves 10 m during a RTT. If a user communicates with the BS directly, when the user receives the acknowledgement for its first request, the user has already moved 10 m away from the user's original location. Such a fast movement not only leads to severe Doppler spread but also deactivates the channel quality indication reported by the user. These channel variations deteriorate the communication link between the user and the BS.

Meanwhile, providing high quality broadband Internet access using the "moving cell" concept based on RoF technologies is problematic because of the requirement of deploying distributed antennas along the rails, which not only introduces gigantic capital expenditures (CAPEXs) but also incurs huge operating expenditures (OPEXs) on maintaining the vastly deployed antennas, especially in rural areas and in areas of rough terrain.

The systems and methods disclosed herein rely on cellular networks as the backhaul for delivering broadband Internet services to high speed trains, but solve the problems encountered in using traditional cellular networks, namely, rapid channel variation and overly frequent handovers.

Now referring to FIG. 1, in one embodiment a system 2 includes an antenna system 10, a control system 20 and at least one wireless access point 30.

The antenna system 10 may include a single antenna 12, a plurality of antennas, or one or more antenna clusters 14 wherein each cluster 14 includes a plurality of antennas 12 with each cluster 14 operating as a single unit, with said roof antenna system 10 optimally dispersed on the outer surfaces of a train 100. Fiber links 40 couple discrete antennas 12 and the on-roof antenna system 10 to the control system 20, and wireless access point(s) 30 to the control system 20. The system 2 virtually extends the antenna of individual users. The antennas 12 may be any suitable antenna known to those having ordinary skill in the art. Examples of suitable antennas 12 include but are not limited to dipole antennas, directional antennas, antenna arrays, and microstrip antennas. The antenna system 10 communicates with cellular networks and relays the data traffic between the users and the cellular networks. The antenna system 10 camouflages/shields the rapid channel variation and frequent handovers from the users. The antennas may be mounted on the exterior of the train and may optimally be mounted on the roof of the train.

In-cabin wireless access points 30 may be any suitable wireless access point known to those having ordinary skill in the art. The wireless access points may be located inside a train car or cabin. Examples of suitable wireless access points 30 may include radio interfaces of multiple access technologies such as LTE, WiMax, and WiFi. Commercially available devices that may serve as wireless access points 30 include but are not limited to IEEE 802.11 wireless access points, small cell base stations and optical access points (visible light communications). The passengers in the train access Internet services via access points 30. The wireless access points may be coupled via fiber 40 and aggregate wireless traffic and communicate the traffic to the control system 20 for processing as described hereinbelow.

The control system 20 may be one or more computers or processors which may be implemented using known hardware, firmware, and/or software, as well as specialized software for carrying out specific functions and actions desirable for implementing embodiments of the invention. For example, control system may include a computer which includes a data processing unit (or processor) and a memory operatively coupled by way of a data and/or instruction bus. The processor may be implemented utilizing any of the known hardware, such as a digital microprocessor, a computer (such as a portable, a stationary and/or a distributed computing system), or any of the other known and/or hereinafter developed data processing units. The memory may be implemented by way of separate hardware or may be disposed within the data processing unit, and any of the known hardware and/or software for implementing the memory function may be employed.

Data are preferably input to, and output from, the data processing unit by way of an input/output device (or I/O interface). Operators of the control system 2 may desire to input software programs and/or data into the computer by way of an external memory that is coupled to the I/O interface by way of a suitable link (such as a cable, wireless link, etc.) The external memory may be implemented via a flash-drive, disc, remotely located memory device, etc.

The control system 20 may also include an interface device which is operatively coupled to the I/O interface via a suitable link, such as a cable, wireless link, etc. The interface device may include at least one display, as well as an input device, such as a keyboard, mouse, voice recognition system, etc. The operators of the control system 20, such as a technician may utilize the interface device to provide information to the control system in connection with entering appropriate data and/or programs.

The control system 20 manipulates data via suitable software code in accordance with various embodiments of the invention and may display results on the display for consideration by the various operators. In accordance with well-known techniques, the results may also be stored within the memory of the control system 20, output and saved on the external memory device and/or provided in any of a number of other ways.

The control system (sometimes referred to herein as RCS) 20 contains programming operable to schedule passengers' traffic to maintain fairness among users and fully explore capacity of the on-roof antenna system 10. A further function of the control system 20 is to optimize and control the antenna system 10 to maximize network capacity, and includes programming to achieve this end.

Figure 1A:
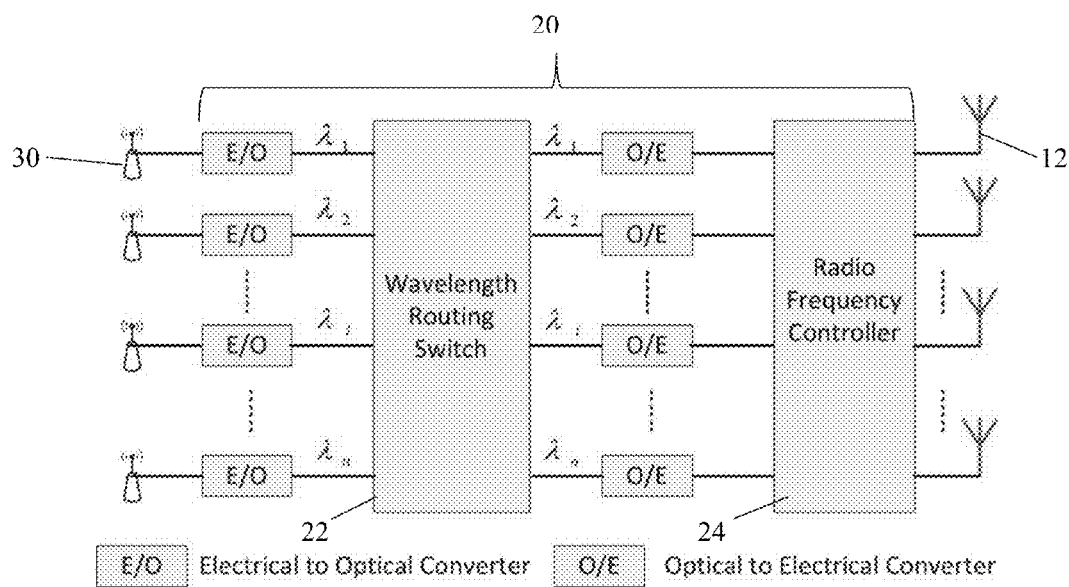
FIG. 1(a) is schematic depiction of a control system of a system according to one or more embodiments of the present invention.

With further reference to FIG. 1(a), in an exemplary embodiment control system 20 includes or is operably coupled to a wavelength routing switch 22 to balance the traffic among different antennas. Since a train usually has a length of about 200 m to about 500 m, the antennas positioned at different locations on the roof can, but do not always, have different channel conditions. Thus, in certain embodiments of the present invention, traffic balancing is required to optimize the utilization of an on-roof antenna system 10. Therefore, the control system 20 may include or be operably coupled to a radio frequency controller (RFC) 24 to process the signals received from or transmitting to antennas 12. Design and optimization of the RFC 24 is important. For example, in certain embodiments, in order to shield channel degradation caused by high speed movement, the antenna system 10 may be grouped into plural antenna clusters 14 and the signals received by the antennas 12 in a cluster 14 are jointly processed to enhance the signal to noise ratio. In further embodiments, the control system 20 using the RFC 24 tracks the speed of the train and the round trip time of the connecting cellular network and adapts its signal processing processes accordingly.

The antenna system control and configuration is operable to obtain a relative stationary channel between a train and its serving BSs and to enhance reliability and capacity of wireless communication links. In order to obtain a relative stationary channel, in one embodiment of the present invention, a control system 20 estimates a return trip time (RTT) between the on-roof antennas and their serving BSs. Based on this RTT estimation, the control system 20 calculates the traveling distance of the train within one RTT and selects the antenna and/or antenna cluster closest to the location where the data request was sent as the receiving antenna for the corresponding acknowledgment. Since the route of a train is predetermined, in one embodiment, RTTs are measured offline and stored in the control system 20. These RTT estimations are retrieved based on the location of a train during operation, that is, movement of the train in transit. In a further embodiment of the present invention, the Doppler shift compensation information at different locations is calculated offline and stored in the control system 20. In certain exemplary embodiments, when processing the received signal, the control system retrieves the Doppler shift compensation information based on an antenna's location and applies the compensation to the received signal.

In one example of one embodiment of the present invention, for the downlink transmission (from the serving BS to the train), the control system 20 applies multiple antennas to jointly receive the signal to reduce the error rates and enhance the reliability of the communication links. For uplink transmission in said example (from the train to its serving BS), the control system 20 adopts multiple stream beamforming to improve the signal to noise ratio (SNR) of the receiving signals in the BS and to establish a reliable communication link in the uplink direction, however the circumstances will dictate whether in any given embodiment the control system 20 uses these techniques or any other techniques described herein as part of a optimization strategy.

In a further exemplary embodiment, given a high SNR, a high order modulation is applied to enhance data rates of the communication links. In yet a further embodiment, applying spatial multiplexing, the control system 20 utilizes multiple antennas to increase the uplink capacity. In a further embodiment, the control system 20 groups the antennas which are located far away from each other, e.g., the antennas at the head of the train and those at the end of the train, into clusters and formulates coordinated multiple point transmission(s) to improve the reliability and capacity of the communication links. All these operation configurations and antenna clustering strategies highly depend on traffic demands, channel conditions, and the antenna deployments.

The selection of carrier frequency is important for RoF links. The cost of semiconductor lasers increases significantly when the modulation frequency is beyond 3 GHz. Therefore, in a preferred embodiment, a low carrier frequency is adopted to minimize the CAPEX. Since the carrier frequencies of current cellular networks are below 3 GHz, said embodiment easily transmits signal over fiber using a carrier frequency of a cellular network(s).

In a further embodiment, a frequency higher than 3 GHz is utilized in the cellular network. The carrier frequency of the cellular network is translated to intermediate frequency (IF) to avoid excessive expenses of semiconductor lasers and to enhance the performance of RoF links. Utilizing on-roof antennas in a MIMO transceiver configuration requires the transport of multiple radio channels between the control system 20 and the on-roof antennas using the same radio carrier frequency. For this particular embodiment, wavelength division multiplexing is employed to minimize the number of required fiber links and the control system 20 is responsible for the wavelength scheduling.

Traffic scheduling algorithms are employed to guarantee the performance of the system 2. Owing to the length of a train, antennas deployed on the roof of different cabins of said train may experience different path losses. Thus, on-roof antennas provide communication links at various data rates. In order to enhance a system QoS, the traffic demands among all passengers are scheduled to select the optimal serving antennas for individual traffic demands in multiple embodiments of the present invention. For example, VoIP applications require small bandwidth but low latency and error rates. Thus, for VoIP applications, some embodiments utilize an antenna with high SNR or beamforming techniques to meet the QoS requirement of VoIP applications. In addition, the system capacity of the present invention should be fairly shared among the passengers. Thus, the control system 20 employs fair traffic scheduling algorithm(s) in some embodiments.

As noted embodiments of the present invention enable a relatively stationary channel between the antennas 12 and the serving BSs. When relative stationarity is achieved, the channel condition may not change dramatically. Additionally, it is easier for the receivers to apply Doppler shift compensation to reduce the inter channel interference.

Figure 2:
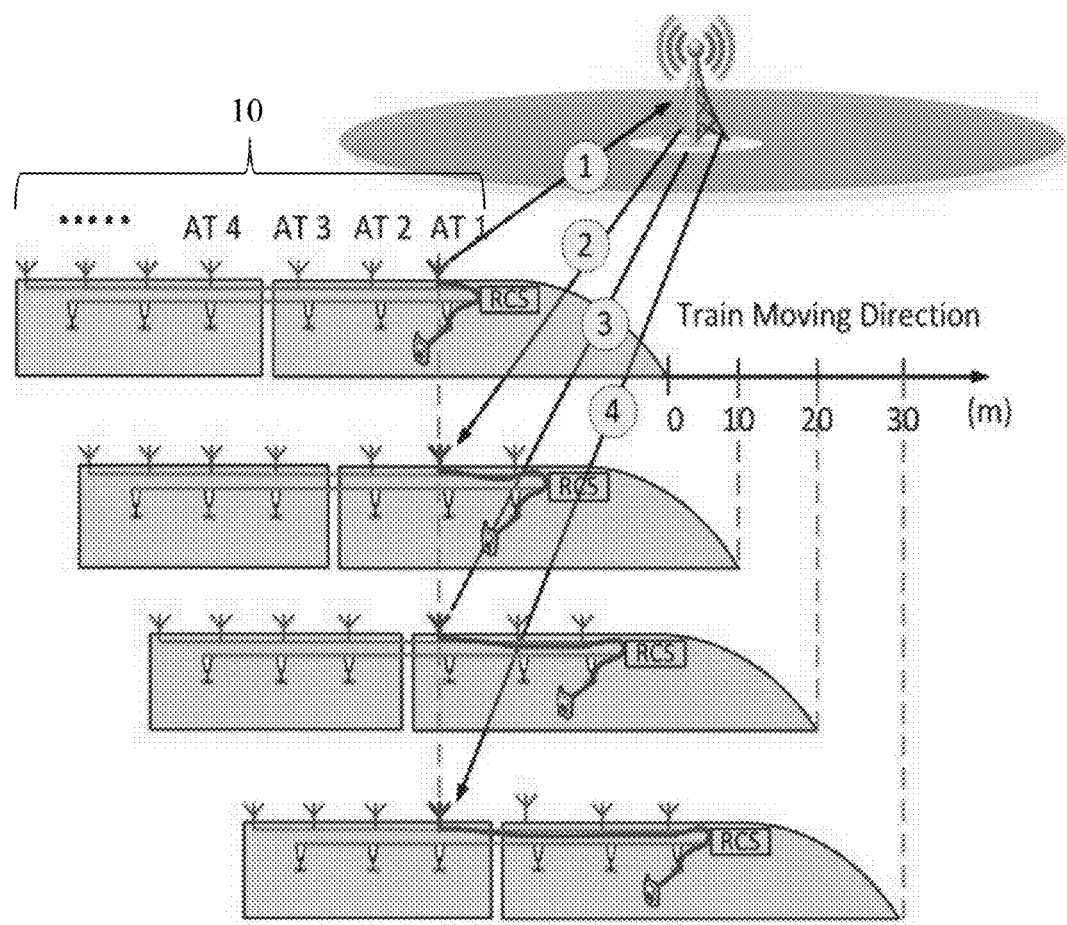
FIG. 2 is a schematic depiction of a manner in which a communication scheme according to one or more embodiments of the present invention addresses rapid channel variations.

By way of illustration, with further reference to FIG. 2, in accordance with one embodiment an on-roof antenna system 10 with a plurality of antennas AT1-AT4 . . . is employed to mask the channel variation from users. It will be apparent the number and arrangement of antennas 12 shown in this and other FIGs and examples herein are illustrative and any number suitable for a particular application can be employed. A user, e,g., a train rider, initiates an access request (step 1) by communicating via a cellular phone or other device with the BS via a first antenna AT1. When the acknowledgement for the request is sent back from the BS, AT1 is already about 10 m away from its original location. The control system 20 tracks the movement of the train and the RTT of the network and selects the antenna or antenna cluster that has the best performance in receiving the signal transmitted to AT1. In the ideal case, the antenna selected for receiving the signal is located at the original location of AT1 (from step 1). In the exemplary embodiment shown in FIG. 2, AT2 is selected (step 2). Selecting AT2 is actually processing the signal received by AT2 as the signal was received by AT1 in the control system 20. Since AT2 is located at the original location of AT1, AT2 experiences the same channel condition as that of AT1 reporting to the BS when AT1 initiates the request. Thus, from the point of view of the BS, the receiving node does not move at all, as shown by steps 3 and 4. From the perspective of the user, the rapid channel condition variations are hidden. Since antennas are deployed along the roof of the train, by proper antenna selection, the control system 20 maintains roughly stable wireless communication links between the BS and the train for a relatively long time equaling to tens of RTTs. For example, the length of a high speed train in China is about 200 m to about 500 m depending on the configuration. If a high speed train moves about 10 m in every RTT, the control system 20 can maintain a roughly stable channel condition for about 20 to about 50 RTTs in the ideal case, i.e., 40-100 times more time of extended stable communications with a BS using embodiments of the present invention as compared to the conventional systems now in place.

Currently, the handover process presents two difficulties in providing high speed trains with broadband Internet services via cellular networks. The first is that owing to the high velocity of the train, it requires a strictly short handover delay. The passengers in the train pass the overlapping area very fast. If the handover delay is not short enough, the passengers will lose their network connections. The second is the handover congestion. A high speed train usually carries hundreds of passengers who will request handovers at almost the same time. This leads to handover congestion in the BS which may result in an unacceptable handover delay. During the handover processes, in certain embodiments, the control system 20 employs traffic scheduling algorithms for switching data traffic from one cell to a new radio cell.

Figure 3:
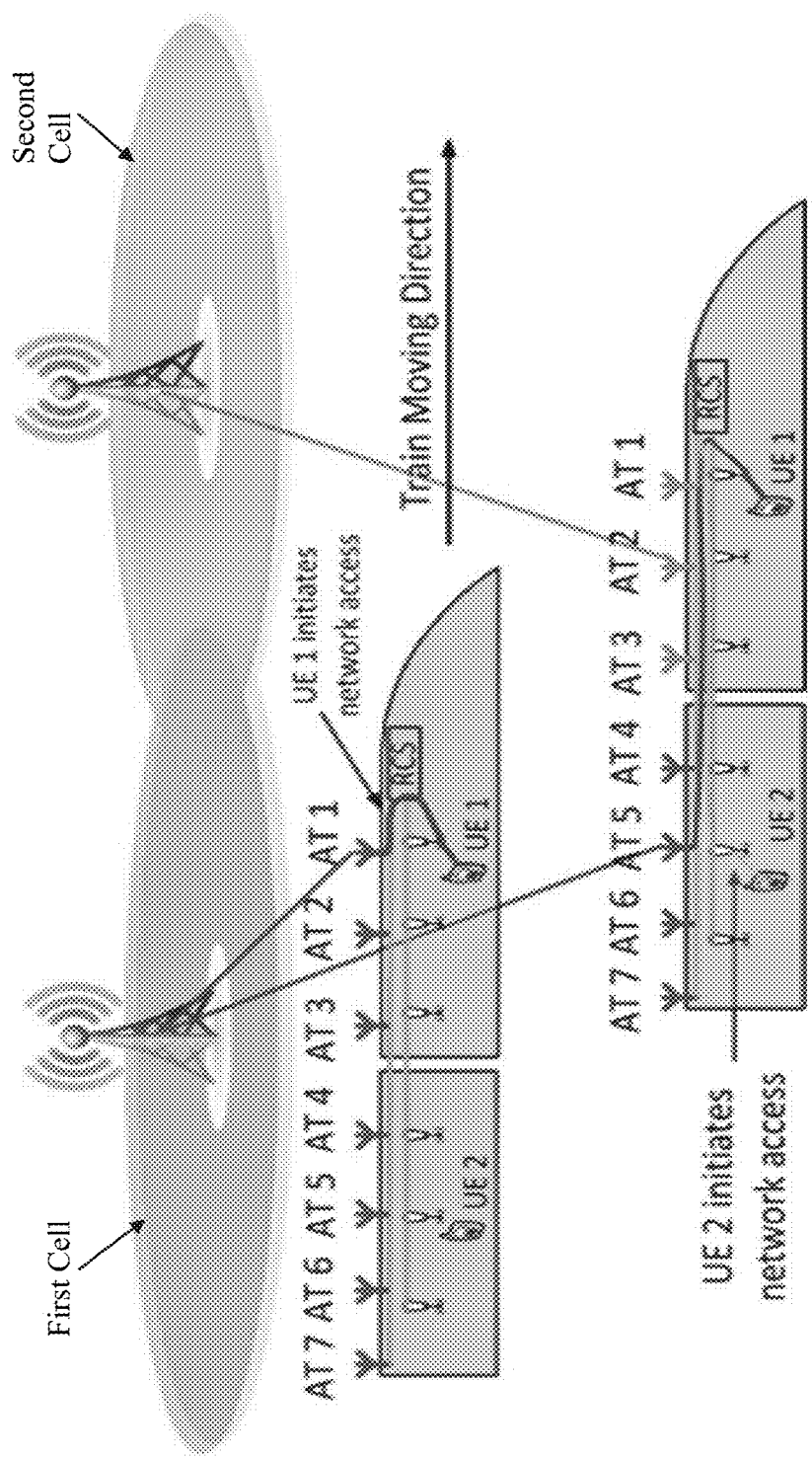
FIG. 3 is a schematic depiction of an example of a handover process according to one or more embodiments of the present invention.

Embodiments of the present invention conceal the handover delay from the passengers and balance the traffic load among the antennas to avoid handover congestion. For example, during the handover processes, in order to optimize the system performance, some traffic demands are handed over in advance into a new radio cell while other traffic demands are better served by the original radio cell. Traffic scheduling algorithms optimally associate traffic demands with different BSs to maximize system performance. With further reference to FIG. 3, by way of illustration, in accordance with one or more embodiments, a first user device UE1 initiates network access when device UE1 is located in the first cell. When the train is moving into the region of the second cell, instead of handing over device UE1 to the second cell immediately, the control system 20 selects the antennas which are still in the first cell, e.g., AT5, to serve device UE1's traffic demands. After the train has established communication links with the second cell, device UE1's traffic demands can be switched to the second cell. In this way, the passengers in the train will not experience the handover delay.

To avoid handover congestion, the control system 20 redistributes the passengers' traffic demand among the antennas AT1-AT7. When device UE2 initiates network access, device UE2 is located in the first cell. In this and other embodiments, the control system 20 predicts device UE2 will eventually handover to the second cell according to the movement of the train. Thus, the control system 20 hands over device UE2's traffic load to the second cell in advance. Although device UE2 is still in the first cell, the control system 20 directs device UE2's traffic to AT2. As a result, device UE2's traffic demands are handed over to the second cell. When the train is within the coverage of multiple cells, the control system 20 determines the traffic demands distribution among these cells and selects proper timing for handing over these traffic demands. In a further embodiment of the present invention, the control system 20 delays the handover of certain user device traffic demands, e.g., UE1, while bringing forward the handover of other users, e.g., UE2. The traffic demand distribution and the handover timing are optimized by control system 20 to maximize the performance the system 2.

Figures 4, 4B, 4C:
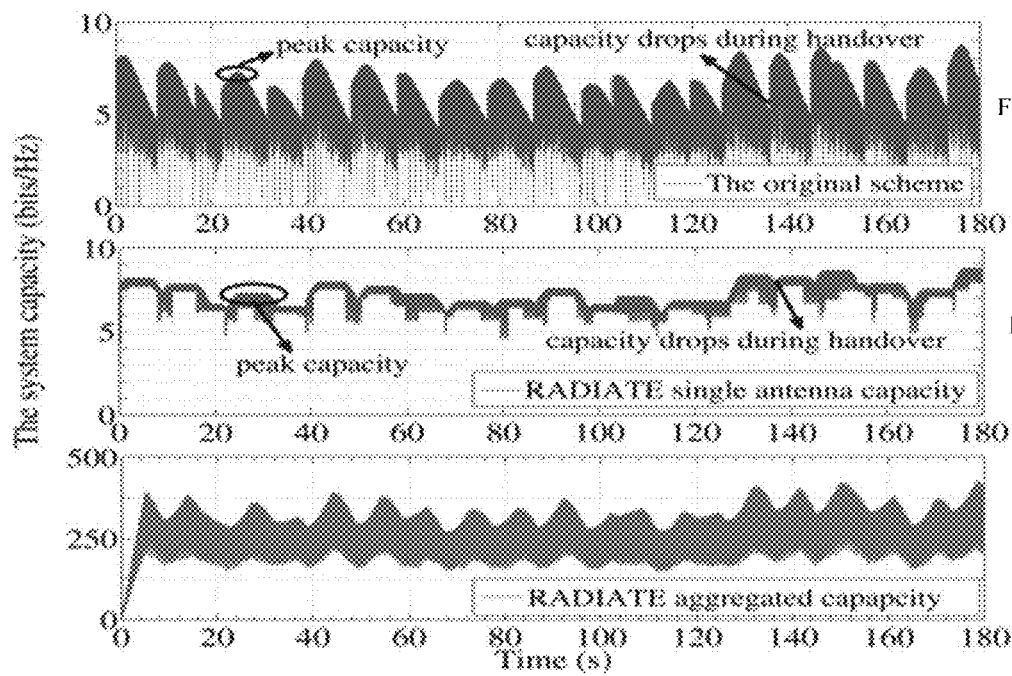

The capacity of embodiments of system 2 compare favorably with a prior art communication scheme in WiMAX networks. In the simulation, the high speed train traverses an area covered by 21 WiMAX BSs at a velocity of 100 m/s. Erceg's empirically path loss model with terrain category B is adopted. See, V. Erceg, L. Greenstein, S. Tjandra, S. Parkoff, A. Gupta, B. Kulic, A. Julius, and R. Bianchi, "An empirically based path loss model for wireless channels in suburban environments," *Selected Areas in Communications, IEEE Journal on*, vol. 17, no. 7, pp. 1205-1211, 1999. The length of the train is 500 m and 50 antennas are deployed in a row on the roof of the train. The distance between two antennas is 10 m. With reference to FIG. 4(*a*), the system capacity of a prior art communication scheme with signal antenna is shown. Owing to its high speed, the train travels through the coverage area very fast and incurs frequent handovers. When the train moves away from a BS, the system capacity drops dramatically. Thus, the system capacity of the prior art scheme goes up and down. Since the train moves very fast and experiences various channel fading, the system maintains its peak capacity for only a very short time.

As compared to the prior art scheme, the presently disclosed systems and methods show two advantages. First, the system 2 maintains high system capacity for a longer time. As shown in FIG. 4(*b*), by leveraging its antenna system, this particular embodiment of the present invention selects the antenna with the best channel condition as the serving antenna and enables the system to maintain its peak capacity for a longer time. Second, systems disclosed herein reduce the capacity drops during the handover process. Thus, the presently disclosed systems are able to ensure quality of service even during handover processes. With reference to FIG. 4(*c*), if all the antennas are utilized simultaneously, the aggregated system capacity is significantly enhanced. The aggregated system capacity is further enhanced in further embodiments of the present invention allowing for joint processing among these antennas.

There are multiple ways to carry out design and deployment of the on-roof antenna system 2 in the present invention. One of the major purposes of deploying the on-roof antenna system 2 is to obtain a relative stationary channel between a high speed train and its serving BS. It will be apparent given the present disclosure that embodiments herein allow for a wide range of design configuration of placement as well as number of antennas. For example, in accordance with some embodiments, to enhance handover performance, a greater number of antennas may be deployed on the head cabin of a train than along other parts of the train roof. Because the head cabin of a train enters a new radio cell first, often it is desired to provision higher capacity in the head cabin of the train to enable the flexibility of handing over data traffic to the new radio cell.

Figure 5:
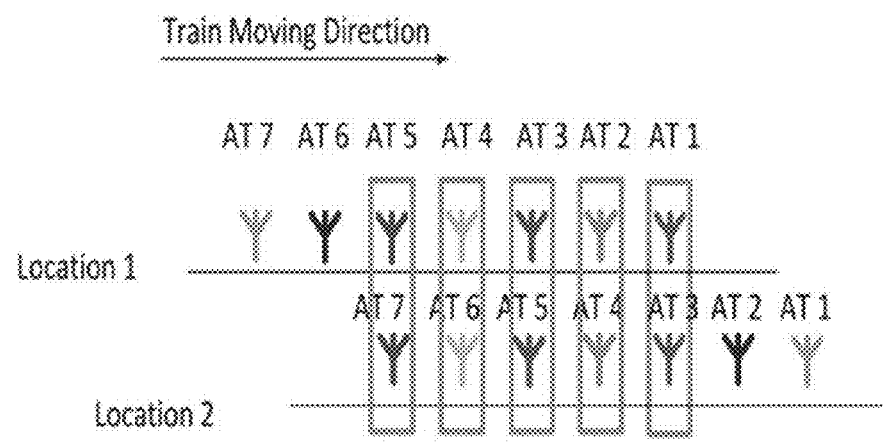
FIG. 5 is a schematic depiction of an example of one dense antenna deployment according to one or more embodiments of the present invention.

When antennas are densely deployed, the probability that system 2 obtains a relative stationary channel is high. When the antennas are sparsely deployed, the probability is reduced. Embodiments of the present invention embrace a one antenna system or a plurality of antennas making up a system. Now referring to FIG. 5, an embodiment includes antennas AT1-AT7 which are relatively densely deployed on the roof of a train. In an example according to this embodiment, a passenger device sends data requests when the train is at location 1 and receives the acknowledgement when the train is at location 2. When antennas are densely deployed, at location 2, the system utilizes AT3 to receive the acknowledgement for the passenger device's data request sent by AT1 when the train is at location 1. In this example utilizing a relatively dense antenna configuration, a relative stationary channel is obtained between the BS and the train by adapting the receiving antennas.

Figure 6:
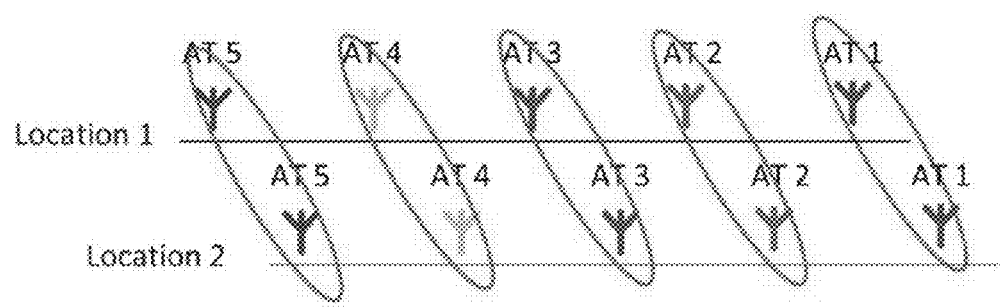
FIG. 6 is a schematic depiction of an example of one sparse antenna deployment according to one or more embodiments of the present invention.

On the other hand, with reference to FIG. 6, if the on-roof antennas, for example, antennas AT1-AT5, are sparsely deployed, the system may not be able to align the antennas to obtain the relatively stationary channel.

Densely deploying antennas increases system data rates. The antennas 12, in certain further embodiments, emulate a multiple input multiple output (MIMO) system to increase data rates via multiple stream beamforming, spatial multiplexing, and/or diversity coding depending on the particular embodiment. In a further embodiment, the control system 20 includes programming to optimally group the antennas into different clusters to perform as a MIMO transceiver based on conditions. The control system 20 treats the antennas as individuals or as clusters based on an optimization strategy. In addition, the control system 20 may contain programming so that it is operable to adapt an antenna usage pattern, e.g., multiple stream beamforming or spatial multiplexing, based on the channel conditions.

As compared to a sparse antenna deployment, a dense antenna deployment enhances the network performance at the cost of not only the CAPEX but also the complexity of the control system 20. Deploying a large number of antennas requires multiple wavelengths for carrying aggregated data traffic with fiber links and increases the cost and the complexity of a control system 20. In addition, in order to optimally utilize the antennas, sophisticated algorithms are implemented in the control system 20, which further complicates its design. Moreover, network performance may not monotonously increase versus the density of the on-roof antennas. Therefore, for each implementation of the present invention the number and arrangement of antennas should be optimized in light of the tradeoff between the network performance and the system cost and complexity.

Although the systems and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention. All references listed and/or referred to herein are incorporated by reference in their entireties.

REFERENCES

[1] "China Railway Market Study." [Online]. Available: http://www.s-ge.com/de/filefield-private/files/1673/field-_blog_public_files/7908
[2] A. Kanafani, H. Benouar, B. Chiou, J.-L. Ygnace, K. Yamada, and A. Dankberg, "California Trains Connected," April 2006, California PATH Research Report. [Online]. Available: http://www.its.berkeley.edu/publications/UCB/2006/PRR/UCB-ITS-PRR-2006-4.pdf
[3] D. Fokum and V. Frost, "A survey on methods for broadband internet access on trains," *Communications Surveys Tutorials, IEEE*, vol. 12, no. 2, pp. 171-185, 2010.
[4] J. Wang, H. Zhu, and N. Gomes, "Distributed antenna systems for mobile communications in high speed trains," *Selected Areas in Communications, IEEE Journal on*, vol. 30, no. 4, pp. 675-683, 2012.
[5] W. Luo, R. Zhang, and X. Fang, "A CoMP soft handover scheme for LTE systems in high speed railway," *EURASIP Journal on Wireless Communications and Networking*, vol. 2012, no. 1, p. 196, 2012.
[6] O. Karimi, J. Liu, and C. Wang, "Seamless wireless connectivity for multimedia services in high speed trains," *Selected Areas in Communications, IEEE Journal on*, vol. 30, no. 4, pp. 729-739, 2012.
[7] A. Seyedi and G. Saulnier, "General ICI self-cancellation scheme for OFDM systems," *Vehicular Technology, IEEE Transactions on*, vol. 54, no. 1, pp. 198-210, 2005.
[8] Y.-C. Yu, M. Okada, and H. Yamamoto, "Study for various array antenna assisted Doppler spread compensator with MRC diversity of ISDB-T receiver," in *Vehicular Technology Conference, 2006. VTC 2006—Spring. IEEE 63rd*, vol. 6, 2006, pp. 2947-2951.
[9] D. Wake, A. Nkansah, and N. Gomes, "Radio over fiber link design for next generation wireless systems," *Lightwave Technology, Journal of*, vol. 28, no. 16, pp. 2456-2464, 2010.
[10] B. Lannoo, D. Colle, M. Pickavet, and P. Demeester, "Radio-over-fiber-based solution to provide broadband internet access to train passengers," *Communications Magazine, IEEE*, vol. 45, no. 2, pp. 56-62, 2007.
[11] K. Ishizu, M. Kuroda, and H. Harada, "Bullet-train network architecture for broadband and real-time access," in *Computers and Communications, 2007. ISCC 2007. 12th IEEE Symposium on*, 2007, pp. 241-248.
[12] Y.-C. Chen, E. M. Nahum, R. J. Gibbens, D. Towsley, and Y. sup Lim, "Characterizing 4G and 3G networks: Supporting mobility with multi-path TCP," technical Report: UM-CS-2012-022. [Online]. Available: http://people.cs.umass.edu/~yungchih/publication/12_mtcp4g_tech_report.pdf
[13] V. Erceg, L. Greenstein, S. Tjandra, S. Parkoff, A. Gupta, B. Kulic, A. Julius, and R. Bianchi, "An empirically based path loss model for wireless channels in suburban environments," *Selected Areas in Communications, IEEE Journal on*, vol. 17, no. 7, pp. 1205-1211, 1999.

What is claimed is:

1. A system for providing broadband Internet service to a train employing radio over fiber comprising a plurality of antennas mounted to an exterior of the train and operable to communicate with at least one cellular network, a plurality of wireless access points mounted to the train, and a control system operably coupled to the plurality of antennas and to the plurality of wireless access points, wherein each of the plurality of antennas is directly coupled to at least one other of the plurality of antennas and to the control system via fiber links, and wherein the plurality of wireless access points are coupled via fiber links and operable to aggregate wireless traffic and communicate the traffic to the control system, and wherein the control system is operable to receive and process data received from the plurality of antennas and the plurality of wireless access points, wherein the control system is configured to transmit a request to a base station using an antenna or antenna cluster of the plurality of antennas, and wherein the control system is further configured to receive an acknowledgement from the base station by selecting another antenna or another antenna cluster of the plurality of antennas located at a certain distance from the location of the antenna or the antenna cluster based on at least the train's movement and a return trip time (RTT) of the base station's network.

2. The system according to claim 1 comprising a plurality of antenna clusters.

3. The system according to claim 1 wherein at least some of the antennas are mounted to a roof of the train.

4. The system according to claim 1 wherein the plurality of wireless access points comprise at least one radio interface selected from Long Term Evolution, (LTE), Worldwide Interoperability for Microwave Access (WiMax), and WiFi.

5. The system according to claim 1 wherein the control system comprises programming operable to schedule cellular communication traffic to maintain fairness among users.

6. The system according to claim 1 wherein the control system comprises programming operable to explore capacity of the plurality of antennas.

7. The system according to claim 1 wherein the control system comprises programming operable to optimize and control the plurality of antennas to maximize network capacity.

8. The system according to claim 1 wherein the control system comprises a wavelength routing switch operable to balance traffic among the plurality of antennas.

9. The system according to claim 1 wherein the control system comprises a radio frequency controller and is operable to process signals received from or transmitting to the plurality of antennas.

10. The system according to claim 9 wherein the control system is operable to collect data relating to the speed of a train and round trip time of a connecting cellular network and adapt its signal processing process based on the collected data.

11. The system according to claim 9 wherein the plurality of antennas is grouped into plural antenna clusters and the control system is operable to jointly process signals received by the antennas in the clusters to enhance signal to noise ratio.

12. A method of providing broadband Internet access using radio over fiber to at least one device residing on a train comprising providing a plurality of antennas on the exterior of the train and operable to communicate with at least one cellular network, providing a plurality of wireless access points mounted to the train, providing a control system operably coupled to the plurality of antennas and to the plurality of wireless access points, wherein each of the plurality of antennas is directly coupled to at least one other of the plurality of antennas and to the control system via fiber links, and wherein the plurality of wireless access points are coupled via fiber links and operable to aggregate wireless traffic and communicate the traffic to the control system, aggregating wireless traffic using the plurality of wireless access points and communicating the traffic to the control system, receiving in the control system data from the plurality of antennas and the at plurality of wireless access points and processing the received data to obtain a relative stationary channel between the train and serving base stations of the at least one cellular network, wherein the control system is configured to transmit a request to a base station using an antenna or antenna cluster of the plurality of antennas, and wherein the control system is further configured to receive an acknowledgement from the base station by selecting another antenna or another antenna cluster of the plurality of antennas located at a certain distance from the location of the antenna or the antenna cluster based on at least the train's movement and an RTT of the base station's network.

13. The method according to claim 12 comprising employing in the control system programming operable to schedule cellular communication traffic to maintain fairness among users.

14. The method according to claim 12 comprising employing in the control system programming operable to explore capacity of the plurality of antennas.

15. The method according to claim 12 comprising employing in the control system programming operable to optimize and control the plurality of antennas to maximize network capacity.

16. The method according to claim 12 comprising providing the control system with a wavelength routing switch operable to balance traffic among the plurality of antennas.

17. The method according to claim 12 comprising providing the control system with a radio frequency controller.

18. The method according to claim 17 comprising collecting data relating to the speed of a train and round trip time of a connecting cellular network and adapting signal processing processes based on the collected data.

19. The method according to claim 17 comprising grouping the plurality of antennas into plural antenna clusters and jointly processing signals received by the antennas in the clusters to enhance signal to noise ratio.

20. The method according to claim 12 comprising estimating an RTT between the plurality of antennas and serving base station based on a location of a train during operation of the train, calculating based on the return trip estimation a traveling distance of the train within one RTT and selecting at least one of the plurality of antennas closest to a location where a data request was sent as a receiving antenna for a corresponding acknowledgment.

21. The method according to claim 12 comprising retrieving Doppler shift compensation information based on a location of at least one of the plurality of antennas and applying compensation to the received signal.

22. The method according to claim 12 comprising applying via the control system multiple antennas to jointly receive a downlink transmission signal from a serving base station to the train to reduce error rates and enhance reliability of communication links.

23. The method according to claim 12 comprising applying via the control system multiple stream beamforming for transmitting signals from the train to a serving base station to improve signal to noise ratio of receiving signals in the serving base station and to enhance reliability of a communication link in an uplink direction.

* * * * *